US005620543A

United States Patent [19]

Marusawa et al.

[11] Patent Number: 5,620,543
[45] Date of Patent: Apr. 15, 1997

[54] METHOD OF MANUFACTURING MICROWAVE MAGNETIC MATERIAL BODY

[75] Inventors: Hiroshi Marusawa; Takehiro Kounoike; Kunisaburo Tomono, all of Nagaokakyo, Japan

[73] Assignee: Murata Manufacturing Co., Ltd., Japan

[21] Appl. No.: 382,609

[22] Filed: Feb. 2, 1995

Related U.S. Application Data

[62] Division of Ser. No. 154,586, Nov. 18, 1993, Pat. No. 5,459,439.

[30] Foreign Application Priority Data

Nov. 25, 1992 [JP] Japan .................................... 4-314885

[51] Int. Cl.$^6$ ............................ B32B 31/18; B32B 31/26

[52] U.S. Cl. ............................ 156/89; 156/250; 264/61; 333/1.1

[58] Field of Search ................................ 156/89; 264/61; 333/1.1

[56] References Cited

U.S. PATENT DOCUMENTS

| | | | |
|---|---|---|---|
| 2,985,939 | 5/1961 | Brockman . | |
| 3,505,139 | 4/1970 | Wentworth | 264/61 X |
| 3,623,035 | 11/1971 | Kobayashi et al. . | |
| 3,662,387 | 5/1972 | Grimes . | |
| 3,763,045 | 10/1973 | Takamizawa et al. . | |
| 4,388,131 | 6/1983 | Unger et al. . | |
| 5,068,629 | 11/1991 | Nishikawa et al. . | |
| 5,349,743 | 9/1994 | Grader et al | 264/61 X |

*Primary Examiner*—David A. Simmons
*Assistant Examiner*—M. Curtis Mayes
*Attorney, Agent, or Firm*—Ostrolenk, Faber, Gerb & Soffen, LLP

[57] ABSTRACT

A microwave magnetic material body for use in a microwave non-reciprocal circuit element is constructed by sintering a laminated body obtained by laminating a plurality of magnetic sheets.

11 Claims, 4 Drawing Sheets

METHOD OF MANUFACTURING MICROWAVE MAGNETIC MATERIAL BODY

This application is a divisional application of application Ser. No. 08/154,586, filed Nov. 18, 1993, now U.S. Pat. No. 5,459,439.

BACKGROUND OF THE INVENTION

1. Field of the Invention

The present invention relates to a microwave magnetic material body used for a non-reciprocal circuit element used in a microwave band and a method of fabricating the same.

2. Description of the Prior Art

In mobile communication equipment such as a portable telephone or a car telephone, the miniaturization and the diversity thereof have progressed in recent years. Correspondingly, miniaturization and diversity have been also required in a non-reciprocal circuit element used in the above described mobile communication equipment.

Examples of the above described non-reciprocal circuit element include an element having a plurality of center electrodes disposed so as to cross each other in an electrically insulated state and plate-shaped microwave magnetic material bodies disposed on and beneath the plurality of center electrodes and further constructed so that a DC magnetic field is applied to respective portions of the plurality of center electrodes, that is, a so-called lumped-constant type non-reciprocal circuit element. Examples include a lumped-constant type circulator or isolator.

One example of a method of fabricating the above described non-reciprocal microwave circuit element will be described with reference to FIG. 5. A center electrode 42*a* is disposed on a disc-shaped microwave magnetic material body 41*a*. The center electrode 42*a* is in such a shape as to radially extend through the center of the upper surface of the microwave magnetic material body 41*a* and further lead to the side surface of the microwave magnetic material body 41*a*. An insulating film 43*a* made of an insulating material is then disposed on the above described center electrode 42*a*, and a center electrode 42*b* is disposed thereon so as to cross the center electrode 42*a*. Furthermore, an insulating film 43*b*, a center electrode 42*c* and an insulating film 43*c* are disposed in this order on the center electrode 42*b*, and a microwave magnetic material body 41*b* is superimposed thereon and fixed. Thereafter, permanent magnets are disposed on and beneath a structure interposed between the above described microwave magnetic materials material bodies 41*a* and 41*b* so that a DC magnetic field is applied to the structure.

The above described microwave magnetic material bodies 41*a* and 41*b* have been conventionally fabricated using the following method. Specifically, magnetic powders are put into a metal mold and are press-formed, to obtain a formed body. The formed body obtained is sintered to obtain a microwave magnetic material body 44 shown in FIG. 6. The microwave magnetic material body 44 is mechanically polished so as to have a predetermined thickness, thereby to fabricate a microwave magnetic material body 45 shown in FIG. 7.

As described above, the microwave magnetic material body 45 used for a non-reciprocal circuit element has been conventionally fabricated by obtaining a formed body using a powder press forming process and mechanically polishing a sintered body obtained by sintering the formed body. This process must be used because a thin formed body cannot be fabricated using the powder press forming process consequently a thick formed body must first be fabricated and then a thin microwave magnetic material body 45 is formed by polishing after sintering the thick formed body as described above.

Furthermore, in the conventional method, the powder press forming process has been used to obtain a microwave magnetic material body. Accordingly, metal molds corresponding to the sizes of objective microwave magnetic material bodies are respectively prepared, thereby to cope with the diversity of components. As the miniaturization and the diversity of the components have progressed, however, the various types of metal molds or the like has increased, and the polishing process and the powder forming process have become complicated. As a result, mass productivity is lowered, resulting in very high fabricating costs.

SUMMARY OF THE INVENTION

An object of the present invention is to provide a microwave magnetic material body constructed so as to easily permit miniaturization and the diversity of a microwave circuit element, and a method of fabricating a microwave magnetic material body which can allow for the miniaturization and the diversity of components and allows the above described microwave magnetic material body to be supplied at low cost.

A first embodiment of the present invention provides a microwave magnetic material body used for a microwave non-reciprocal circuit element, which is constructed by sintering a laminated body obtained by laminating a plurality of magnetic sheets.

Furthermore, a second embodiment of the present invention provides a method of fabricating a microwave magnetic material body, which includes the steps of forming a plurality of sheets of magnetic paste obtained by thoroughly mixing magnetic powders with a binder resin and a solvent, laminating the plurality of magnetic sheets obtained to obtain a laminated body, and sintering the laminated body.

In the first and second embodiments of the present invention, the plurality of magnetic sheets are laminated and the laminated body obtained is sintered, thereby finally obtain a microwave magnetic material body. In this case, the magnetic sheet can be formed by an arbitrary sheet forming process such as the doctor blade process. However, a much thinner magnetic sheet can be easily obtained by the sheet forming process, as compared with the powder press forming process conventionally used.

Consequently, the respective thicknesses of the plurality of magnetic sheets are adjusted and the number of magnetic sheets is further adjusted, thereby to make it possible to easily fabricate a microwave magnetic body having a desired thickness.

In the conventional method of fabricating a microwave magnetic material body, complicated polishing work has been required so as to finally adjust the thickness of the microwave magnetic material body. On the other hand, according to the present invention, such polishing work can be omitted. Moreover, in the conventional fabricating method, the powder press forming process has been used, so that various high-cost metal molds must be prepared depending on the shape of the microwave magnetic material body. On the other hand, in the present invention, such high-cost metal molds are not required, so that the microwave magnetic material body having a desired shape and a thickness can be provided at low cost, thereby to make it possible to easily allow for miniaturization and the diversity of the microwave non-reciprocal circuit element. Accordingly, the present invention can greatly contribute to the miniaturization and the diversity of a mobile communication equipment such as a car telephone.

The microwave magnetic material body according to the present invention can be utilized for a microwave non-reciprocal circuit element such as a circulator or an isolator conventionally known. In accordance with a particular aspect of the present invention, there is provided a microwave non-reciprocal circuit element comprising a pair of microwave magnetic material bodies and a plurality of center electrodes disposed in a state where they are electrically insulated from each other between the microwave magnetic material bodies and so as to cross each other in their central portions, and wherein the above described microwave magnetic material body is constructed by sintering a laminated body obtained by laminating a plurality of magnetic sheets, and a DC magnetic field is applied to the portions where the center electrodes cross each other by a permanent magnet.

The above described microwave non-reciprocal circuit element is constructed using the microwave magnetic material body according to the present invention, thereby to make it possible to easily prepare a microwave magnetic material body having a desired thickness by adjusting the respective thicknesses of the magnetic sheets and the number of magnetic sheets.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A illustrates a plurality of magnetic sheets to be laminated, FIG. 1B illustrates a laminated body, and FIG. 1C illustrates a laminated body cut in a desired shape;

DESCRIPTION OF THE PREFERRED EMBODIMENTS

A non-restrictive embodiment of a microwave magnetic material body and a method of fabricating the same according to the present invention will be described to clarify the present invention.

First, magnetic powders are thoroughly mixed with a binder resin, a solvent and the like, to obtain a magnetic paste. Examples of the magnetic powders includes magnetic powders mainly comprised of yttrium oxide ($Y_2O_3$) and iron oxide ($Fe_2O_3$) and magnetic powders mainly comprised of nickel oxide (NiO) and iron oxide ($Fe_2O_3$). The above described binder resin is used so as to combine the above described magnetic powders with each other. Examples of the binder resin include polyvinyl alcohol. The solvent is used to obtain the above described magnetic paste using the magnetic powders and the binder resin. Examples of the solvent include toluene and ethanol.

The above described magnetic paste is then formed by a sheet forming process, to obtain a thin magnetic sheet having a thickness of several microns to several tens of microns. In the sheet forming process, known sheet forming processes such as the doctor blade process can be employed.

Figure 1A:
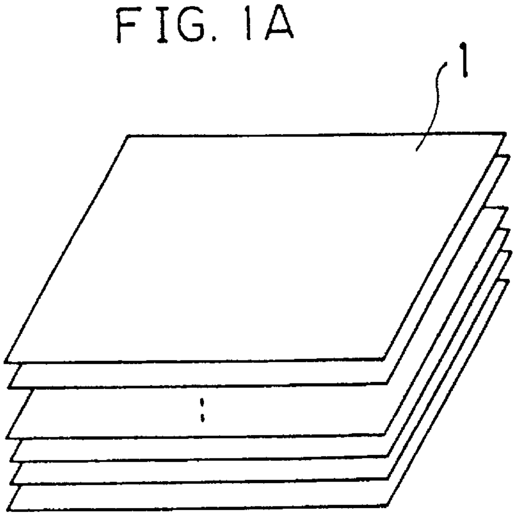
FIGS. 1A to 1C are respectively perspective views for explaining the fabricating processes of a microwave magnetic material body according to the present embodiment, where

A plurality of magnetic sheets obtained are laminated as shown in FIG. 1A depending on the thickness of an objective microwave magnetic material body. In FIG. 1A, reference numeral 1 denotes each magnetic sheet.

Figure 1B:
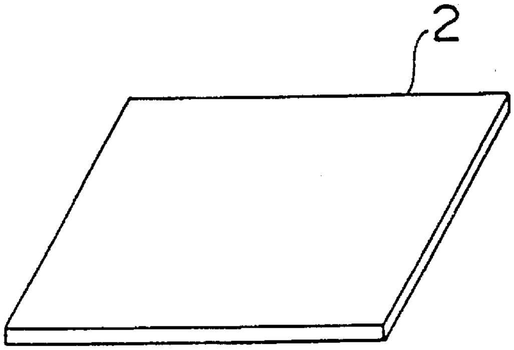
Figure 1C:
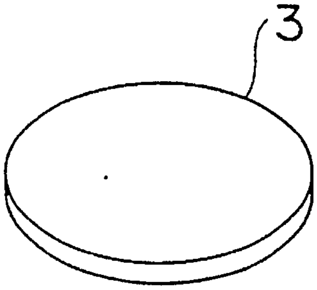

A laminated body obtained by laminating the plurality of magnetic sheets 1 as described above is pressed in the direction of thickness, to obtain a laminated body 2 shown in FIG. 1B. Thereafter, the laminated body 2 is cut using a punch or the like, to obtain a disc-shaped laminated body 3 shown in FIG. 1C.

Figure 2:
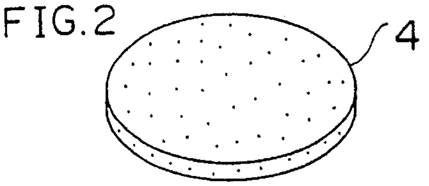
FIG. 2 is a perspective view showing a microwave magnetic material body according to one embodiment of the present invention.

The above described disc-shaped laminated body 3 is then sintered at temperatures of, for example, 1300° C. to 1600° C., thereby to obtain a microwave magnetic material 4 shown in FIG. 2.

As described in the foregoing, in the present invention, the thickness of the microwave magnetic material body 4 finally obtained is determined depending on the thickness of the laminated body 2 obtained by laminating the plurality of magnetic sheets 1. Consequently, the number of magnetic sheets 1 used is adjusted considering the contraction of the magnetic sheets 1 by pressing and sintering in obtaining the above described laminated body 2, thereby to make it possible to easily obtain the microwave magnetic material body 4 having a desired thickness. In the conventional fabricating method, the thick microwave magnetic material body 44 must be mechanically polished in obtaining the microwave magnetic material body 45. On the other hand, in the present embodiment, the adjustment of the thickness by the above described polishing work can be omitted, thereby to make it possible to easily provide a thin microwave magnetic material body having a thickness of approximately several tens of microns to several hundred microns.

Figure 5:
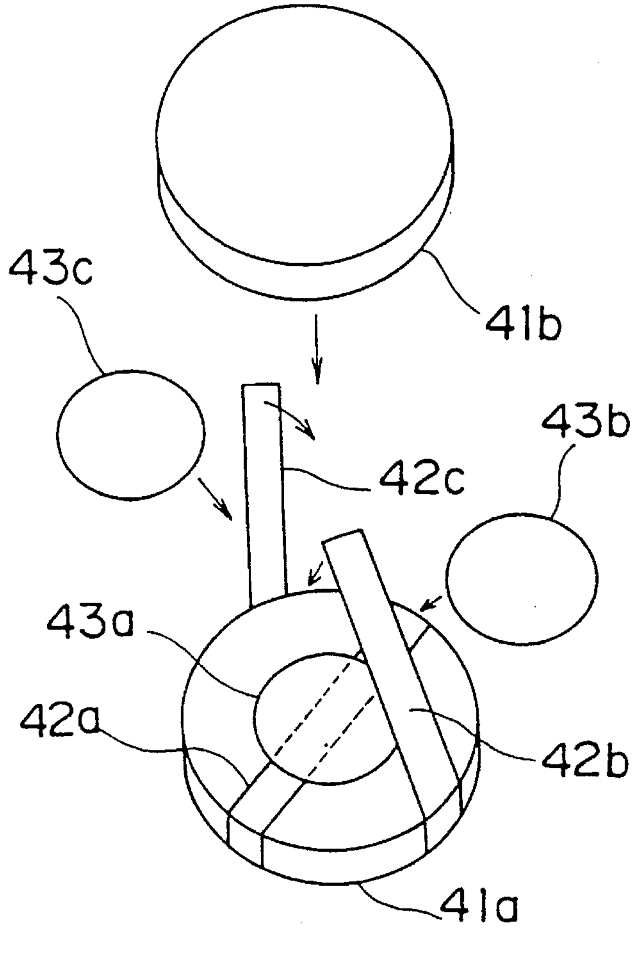
FIG. 5 PRIOR ART
FIG. 5 is a perspective view for explaining the processes for assembling a conventional microwave non-reciprocal circuit element.
Figure 6:
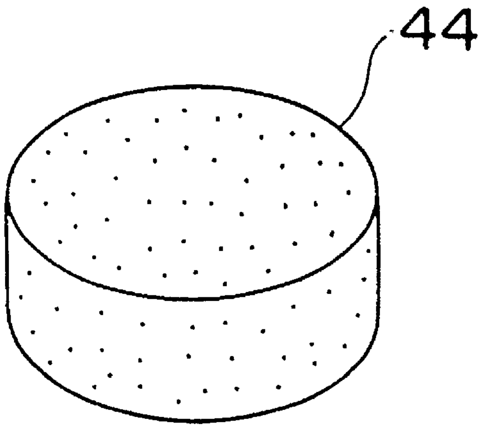
FIG. 6 PRIOR ART
FIG. 6 is a perspective view showing a magnetic material body prepared in fabricating a conventional microwave magnetic material.
Figure 7:
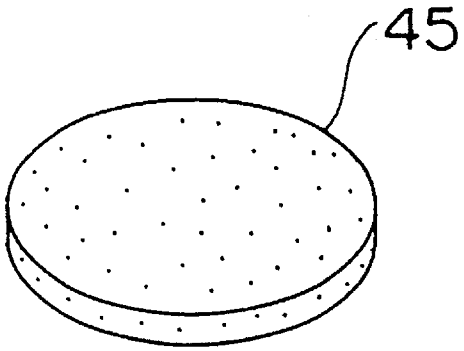
FIG. 7 PRIOR ART
FIG. 7 is a perspective view showing a microwave magnetic material body obtained by a conventional fabricating method.

Furthermore, the microwave magnetic material body 4 obtained in the above described embodiment can be directly used as the microwave magnetic material bodies 41*a* and 41*b* used in the conventional method of fabricating the microwave non-reciprocal circuit element described with reference to, for example, FIG. 5.

One example of a microwave non-reciprocal circuit element constructed using the microwave magnetic material body 4 obtained in the above described embodiment will be described with reference to FIGS. 3 and 4.

Figure 3:
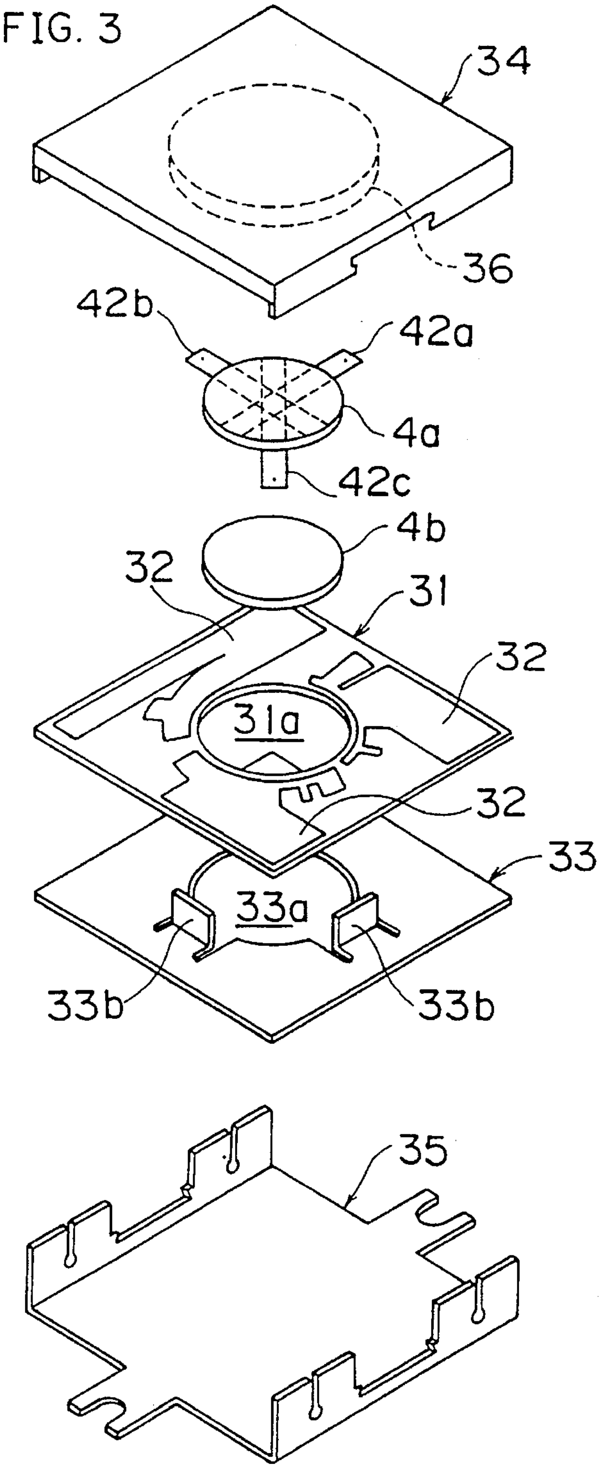
FIG. 3 is a perspective view for explaining the processes for assembling the microwave non-reciprocal circuit element using microwave magnetic material bodies in the embodiment of the present invention.
Figure 4:
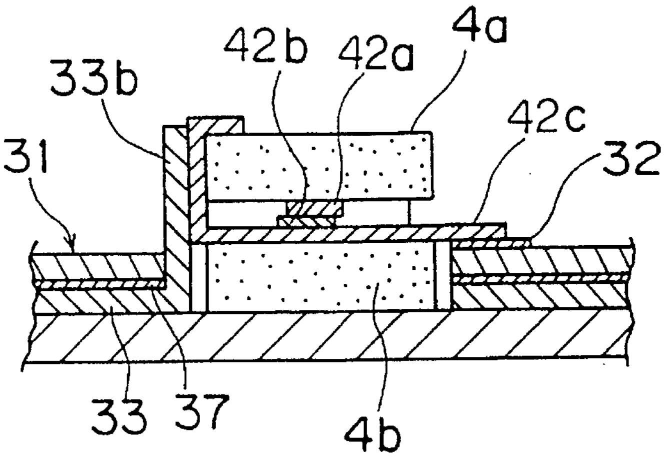
FIG. 4 is a cross sectional view showing main portions of the microwave non-reciprocal circuit element shown in FIG. 3.

FIG. 3 is a perspective view for explaining the assembly processes of the microwave non-reciprocal circuit element, and FIG. 4 is a cross sectional view showing main portions of the assembled microwave non-reciprocal circuit element. In FIGS. 3 and 4, microwave magnetic material bodies 4*a* and 4*b* are used. The microwave magnetic material bodies 4*a* and 4*b* are obtained in the same manner as the microwave magnetic material body 4 in the above described embodiment.

A through hole 31*a* containing the above described microwave non-reciprocal circuit element is first formed in the center of a rectangular substrate 31 made of an insulating material such as alumina. Electrodes for taking out capacitance 32 are formed on the upper surface of the substrate 31 by printing a conductive film.

On the other hand, a ground electrode is formed on the lower surface of the substrate 31 so as to be opposed to the above described electrodes for taking out capacitance 32*a* while being separated by the substrate 31. In addition, a ground plate 33 as illustrated below is joined to the ground electrode by soldering, so that the substrate 31 and the ground plate 33 are integrated. The ground plate 33 is a metal plate, has a through hole 33*a* in its center, and has raised portions 33*b* in its portions facing the through hole 33*a*. The raised portions 33*b* are projected upward through the through hole 31*a* of the substrate 31 in a state where the substrate 31 and the ground plate 33 are joined to each other as described above.

Furthermore, the above described microwave magnetic material bodies 4*a* and 4*b* are laminated while being separated by a plurality of center electrodes 42*a* to 42*c* as illustrated. The center electrodes 42*a* to 42*c* are constructed in the same manner as the center electrodes 42*a* to 42*c* in the prior art shown in FIG. 5. It should be noted that the illustration of members for electrically insulating the plurality of center electrodes 42*a* to 42*c* from each other is omitted in FIGS. 3 and 4.

As apparent from FIG. 4 showing main portions after the assembly, the above described raised portions 33*b* are connected to respective ends of the center electrodes 42*a* to 42*c* in the above described microwave non-reciprocal circuit element by soldering or the like. In addition, reference numeral 37 shown in FIG. 4 denotes a ground. electrode formed on the lower surface of the substrate 31. The above described electrodes for taking out capacitance 32, the substrate 31, and the ground electrode 37 formed on the reverse surface of the substrate 31 constitute a capacitance for impedance matching.

On the other hand, the respective other ends of the center electrodes 42*a* to 42*c* in the microwave non-reciprocal circuit element are electrically connected to the electrodes for taking out capacitance 32 formed on the upper surface of the substrate 31, although only the center electrode 42 is illustrated in, for example, FIG. 4. Similarly, the other ends of the respective other center electrodes 42*a* and 42*b* are also electrically connected to the other electrodes for taking out capacitance 32.

Returning to FIG. 3, the substrate 31 and the ground plate 33 are laminated, and the microwave non-reciprocal circuit element is incorporated into the through holes 31*a* and 33*b* and is interposed between yokes 34 and 35, thereby to construct a microwave non-reciprocal circuit device. A permanent magnet 36 is fixed to the lower surface of the yoke 34. The yokes 34 and 35 are made of a metal material, and are so constructed that a pair of opposed edges of one of the yokes is bent toward a pair of opposed edges of the other yoke and both the yokes are fixed to each other by solder or the like or mechanical engagement utilizing the bent portions.

Furthermore, although in the above described embodiment the microwave magnetic material bodies 4, 4*a* and 4*b* are so constructed as to finally have a disc shape, the plane shape of the microwave magnetic material bodies is not limited to the disc shape as illustrated. For example, the plane shape can be changed into an arbitrary shape such as a rectangular shape. Moreover, in the present embodiment, the above described laminated body 2 is cut by a punch or the like to obtain the laminated body 3 having a desired plane shape. Therefore, it is possible to provide a microwave magnetic material body having a desired shape without requiring more complicated and higher-cost work such as a change in a metal mold, as compared with the conventional method of fabricating the microwave magnetic material body using the powder press forming process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of fabricating a microwave magnetic material body, comprising the steps of:

forming a magnetic paste obtained by mixing magnetic powders with a binder resin and a solvent;

forming a plurality of sheets from said magnetic paste;

laminating said plurality of magnetic sheets together to obtain a laminated body;

forming said laminated body in a disc shape; and sintering the laminated body.

2. The method of fabricating a microwave magnetic material body according to claim 1, wherein said step of forming said sheets comprises the step of using a doctor blade to form said sheets.

3. The method of fabricating a microwave magnetic material body according to claim 1, wherein said magnetic powders comprise yttrium oxide and iron oxide.

4. The method of fabricating a microwave magnetic material body according to claim 1, wherein said magnetic powders comprise nickel oxide and iron oxide.

5. The method of fabricating a microwave magnetic material body according to claim 1, wherein polyvinyl alcohol is used as said binder resin.

6. The method of fabricating a microwave magnetic material body according to claim 1, wherein each of said plurality of magnetic sheets has a thickness of several microns to several tens of microns.

7. A method of fabricating a microwave magnetic material body, comprising the steps of:

forming a magnetic paste obtained by mixing magnetic powders with a binder resin and a solvent;

forming a plurality of sheets from said magnetic paste, each of said plurality of magnetic sheets having a thickness of several microns to several tens of microns;

laminating said plurality of magnetic sheets together to obtain a laminated body; and sintering the laminated body to form the microwave magnetic material body.

8. The method of fabricating a microwave magnetic metal body according to claim 7, wherein said step of forming said sheets comprises the step of using a doctor blade to form said sheets.

9. The method of fabricating a microwave magnetic material body according to claim 7, wherein said magnetic powders comprise yttrium oxide and iron oxide.

10. The method of fabricating a microwave magnetic material body according to claim 7, wherein said magnetic powders comprise nickel oxide and iron oxide.

11. The method of fabricating a microwave magnetic material body according to claim 7, wherein polyvinyl alcohol is used as said binder resin.

* * * * *